United States Patent
Ejiri

(10) Patent No.: US 7,352,528 B2
(45) Date of Patent: Apr. 1, 2008

(54) LEADER TAPE AND MAGNETIC TAPE CARTRIDGE USING THE SAME

(75) Inventor: Kiyomi Ejiri, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 374 days.

(21) Appl. No.: 11/084,049

(22) Filed: Mar. 21, 2005

(65) Prior Publication Data

US 2005/0213248 A1 Sep. 29, 2005

(30) Foreign Application Priority Data

Mar. 26, 2004 (JP) ............... P.2004-091823

(51) Int. Cl.
G11B 5/78 (2006.01)
(52) U.S. Cl. .................................... 360/134
(58) Field of Classification Search ........ None
See application file for complete search history.

(56) References Cited

U.S. PATENT DOCUMENTS 5,677,033 A * 10/1997 Hamano et al. ......... 428/141
6,458,453 B1 * 10/2002 Hayashi et al. ......... 428/323
6,696,183 B2 * 2/2004 Onodera et al. ......... 428/837
2004/0159733 A1 8/2004 Sato et al.
2004/0214046 A1 * 10/2004 Ejiri et al. ........... 428/694 SG
2005/0173577 A1 * 8/2005 Ohno ..................... 242/332.7
2005/0189447 A1 * 9/2005 Onmori .................. 242/348.3
2005/0213247 A1 * 9/2005 Doushita ................. 360/132
2005/0214525 A1 * 9/2005 Ohno ..................... 428/327

FOREIGN PATENT DOCUMENTS

JP 61-71411 A 4/1986
JP 2001-110164 A 4/2001
JP 2004-22103 A 1/2004

OTHER PUBLICATIONS

European Search Report dated Mar. 12, 2007.

* cited by examiner

Primary Examiner—Allen Cao
(74) Attorney, Agent, or Firm—Sughrue Mion, PLLC

(57) ABSTRACT

A leader tape comprising a support and a coating layer containing a powder and a binder, wherein at least one surface of the leader tape has a center line average roughness (Ra) of from 10 to 60 nm, and the leader tape has a cupping of from 0 to 1 mm per a width of ½ inch.

9 Claims, 4 Drawing Sheets

LEADER TAPE AND MAGNETIC TAPE CARTRIDGE USING THE SAME

FIELD OF THE INVENTION

The present invention relates to a leader tape and a magnetic tape cartridge rotatably housing a reel having a wound magnetic tape which is joined with the leader tape on a cartridge case.

BACKGROUND OF THE INVENTION

Hitherto, as a magnetic tape cartridge which is used as a recording medium to be used in an external storage unit such as computers, there is known a type in which a magnetic tape is wound on a single reel or plural reels, and the reel or reels are rotatably housed in a cartridge case. Since this magnetic tape is used for data preservation of a computer, etc. and stores important information, it is constructed such that a trouble such as tap jamming does not occur and that the magnetic tape is not carelessly unloaded.

Also, in a cartridge of a single reel type, for the purpose of unloading the magnetic tape, the tip of the magnetic tape is fixed with a leader member such as a leader pin and a leader block or joined with a leader tape made of a relatively rigid plastic raw material and having an engaging hole opened in the tip thereof. A drive unit is constructed such that the leader member or leader tape tip is held and unloaded by a holding member in the side of a recording and reproducing unit, thereby executing loading/unloading of the magnetic tape.

However, in unloading the magnetic tape into the side of the magnetic recording and reproducing unit, winding the tip of the magnetic tape in a drive reel within the unit and then executing loading/unloading, the tip portion is brought into contact with and unloaded by a tape guide, a magnetic head, and the like provided in the running passage in the sate that precious positioning has not been made yet and is likely damaged, and therefore, it is preferred to perform reinforcement.

Also, for the purpose of preventing an increase of drop out due to reflection of a difference in level of the leader block generated in the drive reel into a magnetic tape for data recording, it is preferred to perform reinforcement. It is performed to join the tip of a magnetic tape with a leader tape having a higher strength than the magnetic tape (for example, see JP-A-2001-110164).

In recent years, following an increase of the capacity of a magnetic tape cartridge, the recording density is increasing, and a problem of spacing loss due to the foregoing reflection of the magnetic tape for data recording is visualized. Thus, improvements of conventional leader tapes and data tapes have become necessary. Further, if irregular winding (for example, jumping out) of the magnetic tape for data recording occurs, its portion causes permanent set, resulting in drop out.

Now, the leader block is housed in a concave provided in a core portion of a winding reel and is constructed such that a part thereof constitutes a part of the arc face of the core portion in that state.

This is schematically illustrated in FIG. 4A. That is, a leader block 40 is fitted into a concave 42 along the diameter direction of a core portion 41, and for example, an end fade 40a of the leader block 40 constitutes a part of the winding face of the core portion 41 in that state. For the purpose of smoothly winding up a magnetic tape MT, the end face 40a of this leader block 40 is curved and formed in the arc shape corresponding to the outer peripheral face of the core portion 41 as illustrated in the same drawing.

However, in such a conventional tape drive, as illustrated in FIG. 4B, the end face 40a may possibly be in the projected state from the core portion 41 depending upon the dimensional precision of the leader block 40 constructing a part of the winding face, thereby often generating an intolerable difference in level on the winding face of the core portion 41.

Such a difference in level causes a fold or deformation on a leader tape LT, and as illustrated in FIG. 4C, this fold or deformation is also generated in a portion of the magnetic tape MT which is wound up in the subsequent layers to substantially become a recording region (so-called "tape reflection" occurs). Such tape reflection is liable to cause inconveniences such as a phenomenon that a proper distance with a recording and reproducing head is not kept in the step of recording or reproducing information, resulting in impossibility of recording or a loss of information.

If the winding time by the winding reel is short, such tape reflection causes the foregoing problems a little. However, when the magnetic tape MT is used in the state that it is wound up in the winding reel and allowed to stand, there was some possibility that regular tape reflection is generated with a pitch of approximately the peripheral length of the core portion 41 on the surface of the magnetic tape MT.

SUMMARY OF THE INVENTION

An object of the invention is to provide a leader tape which is small in an increase of drop out caused by reflection of a drive reel or a leader block portion due to preservation over a long period of time or running at a high temperature and a magnetic tape cartridge using the same.

The foregoing object of the invention has been achieved by the following means.

(1) A leader tape comprising a support having on at least one surface thereof a coating layer containing a powder and a binder, wherein at least one surface of the leader tape has a center line average roughness (Ra) of from 10 to 60 nm and the leader tape has a cupping of from 0 to 1 mm per a width of ½ inch.

(2) The leader tape as set forth above in (1), wherein the leader tape has a thickness of from 5 to 20 μm.

(3) A magnetic tape cartridge rotatably housing a single reel or plural reels having a magnetic tape wound on a cartridge case, wherein the leader tape as set forth above in (1) or (2) is used as a leader tape which is joined with the tip of the magnetic tape and which leads the magnetic tape, thereby unloading it into a magnetic recording and reproducing unit.

(4) The magnetic tape cartridge as set for the above in (3), wherein the magnetic tape has a thickness of from 3 to 11 μm and a cupping of from 0.3 to 2 mm per a width of ½ inch.

According to the leader tape of the invention, by defining a specified surface roughness, when the leader tape is wound up, a proper space is formed between the tapes, and a pressure is relieved, whereby it becomes possible to prevent reflection of a leader block and the like into a magnetic tape from occurring. Also, by defining a cupping, it is possible to prevent irregular winding of a magnetic tape from occurring.

DESCRIPTION OF REFERENCE NUMERALS AND SIGNS

Figure 1:
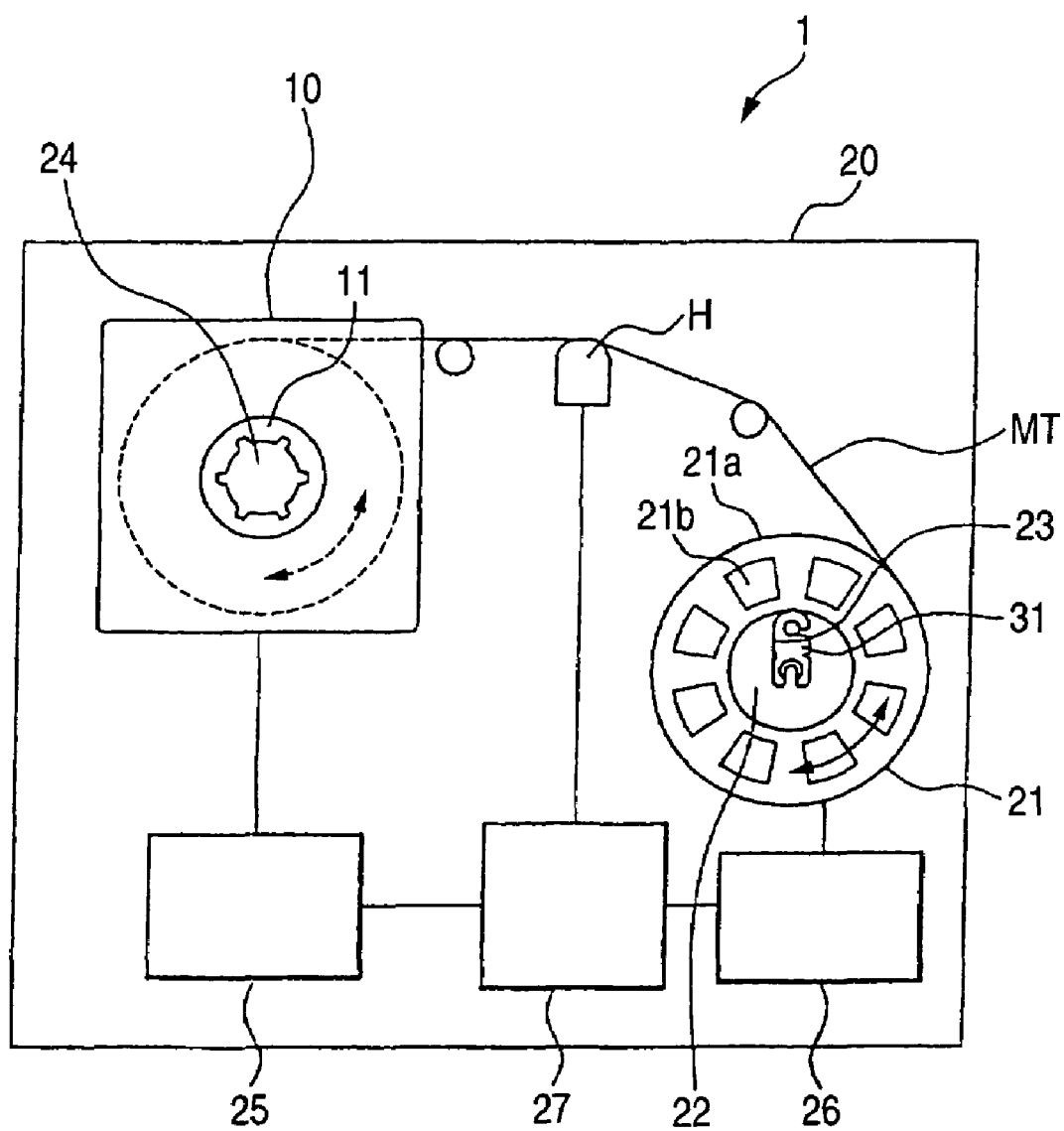
FIG. 1 is a constructive view conceptually showing a magnetic recording and reproducing unit according to one embodiment of the invention.

1: Magnetic recording and reproducing unit
2: CARTRIDGE CASE
2A: UPPER HALF OF CARTRIDGE CASE
2B: LOWER HALF OF CARTRIDGE CASE
10: Magnetic tape cartridge
11: Cartridge reel (delivery reel)
20: Magnetic tape drive
21: Drive reel (winding reel)
21a: Flange portion
21b: Groove
22: Core portion
23: Concave
24: SPINDLE
25: Spindle drive unit
26: Winding reel drive unit
27: Control unit
30: Leader pin
31: Leader block
32: Unloading guide
40a: END FACE
41: CORE PORTION
H: Magnetic head
LT: Leader tape
MT: Magnetic tape

DETAILED DESCRIPTION OF THE INVENTION

At least one surface of the leader tape of the invention has a center line average roughness (Ra) of from 10 to 60 nm.

This Ra means a value measured by an optical interference surface roughness meter (HD-2000 manufactured by WYKO Corporation) under the following conditions.

Ra is calculated after applying cylinder correction and inclination correction under the conditions of object lens: 50 times, intermediate lens: 0.5 times, measurement area: 242 µm×184 µm.

In the invention, the cupping of the leader tape and magnetic tape (also referred to as "data tape") is a value measured under the following conditions.

A tape is cut out into a length of 1 m and held under the measurement circumference (at 23° C. and 50% RH) for 24 hours. A center portion in the longitudinal direction is cut out into a size of 300 mm and allowed to stand on a flat plate for 3 hours in the stage that the magnetic face is positioned upward. Thereafter, a tape width (W2) of the center portion of 300 mm in a length of 100 mm is measured by a comparator. Further, when a slide glass is covered on the same sample, a tape width (W1) thereof is measured.

The cupping refers to a value determined according to the following approximate expression.

$$\text{Cupping}=(W2/2)\tan(S^{1/2})$$

Here, $S=10\times\{1-(1.2W2/W1-0.2)^{1/2}\}$

In the leader tape of the invention, an embodiment in which when the slide glass is covered on a tape segment and the tub-like tape face is brought into contact with the flat face, a back layer as described later comes into contact therewith is preferable. In this case, it is preferable that the opposite face of the back layer has at least a magnetic layer. In this case, the direction of the cupping is also referred to that the magnetic layer is convex, and its symbol is designated as "+". It is preferable that the direction of the cupping is the same as in the data tape.

It is preferable that the leader tape of the invention is used in a magnetic recording and reproducing unit having a track recording density of 100 kfci or more and a difference between a recording tack width and a reproducing track width of from 0 to 16 µm. That is, in the case of a system where the difference between a recording tack width and a reproducing track width exceeds 16 µm, since the recording track width is thoroughly wide as compared with the reproducing track width, even when a track deviation of several µm is generated due to tape deformation, the head runs on the recording track and therefore, does not result in an increase of drop out. However, in a magnetic recording and reproducing unit having a large track recording density and having a difference between a recording track width and a reproducing track width of not more than 16 µm, the track deviation due to tape deformation is visualized, whereby the problem of tape reflection likely occurs. Accordingly, the effect of the leader tape of the invention becomes remarkable when a magnetic recording and reproducing unit having a large track recording density is used.

The magnetic recording and reproducing unit is not particularly limited so far as it is constructed of a magnetic tape cartridge and a magnetic tape drive.

The magnetic tape cartridge is not particularly limited so far as it rotatably houses a single reel or plural reels having a magnetic tape having the leader tape of the invention connected thereto wound on a cartridge case. However, the invention gives rise to a marked effect especially in the case of a single reel.

In the leader tape of the invention, a known splicing tape can be stuck and joined in the state that one end of the leader tape is projected into the tip of a magnetic tape on which signals are recorded and produced. In the other end of the leader tape, an engagement member such as a leader pin is provided and is used for fixing to a drive reel of the magnetic recording and reproducing unit.

In magnetic recording and reproduction, a magnetic tape cartridge provided with the leader tape of the invention may be used in the magnetic recording and producing unit. It is possible to execute recording and reproduction at a track recording density of 100 kfci or more (preferably 120 kfci or more, and more preferably 140 kfci or more) and a difference between a track width (preferably not more than 25 µm, more preferably not more than 15 µm) and a reproducing track width (preferably not more than 15 µm, and more preferably not more than 10 µm) of from 0 to 16 µm (preferably from 0 to 12 µm, and more preferably from 0 to 8 µm) with respect to the magnetic tape having the leader tape joined therewith.

In magnetic recording and reproduction using the leader tape and the magnetic tape cartridge of the invention, even when the recording track width is narrow and the difference between a recording track width and a reproducing track width is small in this way, stable recording and reproduction are obtained while suppressing the track deviation.

The recording and reproducing unit which executes recording and reproduction at the foregoing track width is not particularly limited, and magnetic recording and reproducing units of known embodiments having recording and reproducing heads can be used.

With respect to the magnetic heads to be used in the invention, an inductive head and an MR head can be preferably used for recording and reproduction, respectively.

The invention will be described below in more detail.

Leader Tape

As a coating layer to be provided on a support, one prepared by dispersing a finely particulate inorganic powder in a binder is mainly used. The finely particulate inorganic powder may be a non-magnetic material or a magnetic particle. The coating layer is constructed of a single layer or plural layers. The coating layer is formed on at least one of the face coming into contact with the magnetic head and the face opposite thereto.

The purpose of providing the coating layer is to impart a function which the support does not possess as the need arises. Examples of such a function include containing a polishing particle on the face coming into contact with the magnetic head, thereby bringing a cleaning effect; containing a conductive particle, thereby bringing an antistatic function; and containing a magnetic body, thereby recording magnetic signals.

By further containing a lubricant in the coating layer, it is possible to control a coefficient of friction. As the coating layer, it is preferable that a single-layer construction of a magnetic layer the same as the data tape or a non-magnetic, or a double-layer construction in which a magnetic layer (upper layer) is coated on a non-magnetic layer (lower layer), is provided in the side coming into contact with the magnetic head, and a backcoat layer (back layer) mainly composed of carbon black is provided in the opposite side thereto.

The total thickness of the leader tape is preferably from 5 to 20 μm, and more preferably from 8 to 18 μm.

The thickness of the coating layer is preferably from 0.1 to 5.0 μm, and more preferably from 0.5 to 3.0 μm in terms of the single layer or the total sum of plural layers. The thickness of the support is preferably from 3 to 17 μm, and more preferably from 6 to 15 μm.

The center line average surface roughness Ra of at least one surface of the leader tape is from 10 to 60 nm, and preferably from 15 to 45 nm. Also, at the same time, the leader tape has a cupping of from 0 to 1 mm, and preferably from 0 to 0.6 mm per a width of ½ inch.

In this way, when wound in a reel, a cushioning effect is generated, whereby not only reflection can be prevented, but also irregular winding of the magnetic tape can be prevented. The surface roughness Ra of the leader tape may be substantially the same or different with respect to the front and back faces thereof. The surface roughness can be controlled by various methods. For example, the surface roughness can be controlled by the roughness of the support, the thickness of coating layer, the particle size of inorganic particle to be used in the coating layer, the calendaring conditions, and the like. In the case where the surface roughness is controlled by the roughness of the support, the roughness of the support is adjusted at from 5 to 80 nm, and preferably from 10 to 65 nm. The mean particle size of the inorganic particle which is used in the coating layer is from 0.02 to 1 μm, and preferably from 0.05 to 0.6 μm. With respect to the shape, particular, acicular, tabular or cubic shapes can be employed.

Also, the cupping can be controlled by various methods. For example, the cupping can be controlled by changing the thickness of each of the back layer and the lower layer, changing the residual solvent amount of each of the back layer and the lower layer, and the like. The thickness of the non-magnetic layer (lower layer) is preferably from 0.5 to 3.0 μm, and more preferably from 0.8 to 2.0 μm.

Also, the leader tape preferably has a surface electrical resistance of not more $10^{10}$ Ω/sq, and more preferably not more than $10^9$ Ω/sq. In this way, the electrification of the leader tape is prevented such that the magnetic head is not damaged by electric staticity; reliability is enhanced; and durability of the magnetic tape cartridge obtained by joining of the leader tape basically having a higher strength than the magnetic tape against a loading/unloading repeating operation into the magnetic recording and reproducing unit is enhanced.

As means for controlling the surface electrical resistance in a prescribed level, there is enumerated a method of adding a conductive powder such as carbon black in at least one layer of the lower layer, the upper layer and the back layer. For example, carbon black may be added in an amount of from 1 to 20 parts by weight based on 100 parts by weight of a binder in each of the layers.

It is preferable that the leader tape is constructed such that the lower layer is made of a non-magnetic layer containing an inorganic powder and a binder, the upper layer is made of a magnetic layer containing a ferromagnetic powder and a binder, and a back layer is formed in the opposite side thereto.

The leader tape made of the magnetic tape will be described below in detail.

(Magnetic Layer)

Binder in the Magnetic Layer and Non-Magnetic Layer, Etc.

As a binder to be used in the magnetic layer and the non-magnetic layer, conventionally known thermoplastic resins, thermosetting resins, reactive resins, and mixtures thereof are used. As the thermoplastic resins, ones having a glass transition temperature of from −100 to 150° C., a number average molecular weight of from 1,000 to 200,000, and preferably from 10,000 to 100,000, and a degree of polymerization of from about 50 to 1,000 are used.

Examples of the thermoplastic resins include polymers or copolymers made of a constitutional unit such as vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, and vinyl ether; polyurethane resins; and various rubber based resins. Also, examples of the thermosetting resins or reactive resins include phenol resins, epoxy resins, polyurethane curing type resins, urea resins, melamine resins, alkyd resins, acrylic reactive resins, formaldehyde resins, silicone resins, epoxy-polyamide resins, mixtures of a polyester resin and an isocyanate prepolymer, mixtures of a polyester polyol and a polyisocyanate, and mixtures of a polyurethane and a polyisocyanate. These resins are described in detail in *Plastic Handbook*, published by Asakura Shoten. Also, known electron beam-curing type resins can be used in the respective layers. These examples and production methods thereof are described in detail in JP-A-62-256219.

Though the resin can be used singly or in combination, a combination of at least one kind selected from a vinyl chloride resin, a copolymer of vinyl chloride and vinyl acetate, a copolymer of vinyl chloride, vinyl acetate and vinyl alcohol, and a copolymer of vinyl chloride, vinyl acetate and maleic anhydride with a polyurethane resin and a polyisocyanate is preferable in the invention.

With respect to the structure of the polyurethane resin, known structures such as polyester polyurethane, polyether polyurethane, polyether polyester polyurethane, polycarbonate polyurethane, polyester polycarbonate polyurethane, and polycaprolactone polyurethane can be employed. With respect to all of the binders as enumerated herein, for the sake of obtaining more excellent dispersibility and durability, as the need arises, it is preferred to use one in which at least one polar group selected from COOM, $SO_3M$, $OSO_3M$, $P=O(OM)_2$, $O-P=O(OM)_2$ (wherein M represents a hydrogen atom or an alkali metal base), OH, $N(R)_2$, $N^+(R)_3$ (wherein R represents a hydrocarbon group), an epoxy group, SH, and CN is introduced by copolymerization or addition reaction. The amount of the polar group is from $10^{-1}$ to $10^{-8}$ moles/g, and preferably from $10^{-2}$ to $10^{-6}$ moles/g.

The content of the hydroxyl group in the polyurethane resin is preferably from 3 to 20, and more preferably from 4 to 5 per molecule. When the content of the hydroxyl group is less than 3 per molecule, since the reactivity with the polyisocyanate curing agent is lowered, the coating film strength and durability are likely lowered. On the other hand, when it exceeds 20, the solubility and dispersibility in a solvent are likely lowered. For the purpose of adjusting the content of the hydroxyl group in the polyurethane resin, a compound having trifunctional or polyfunctional hydroxyl groups can be used in synthesis of the polyurethane resin. Specific examples thereof include trimethylolethane, trimethylolpropane, trimellitic acid anhydride, glycerin, pentaerythritol, hexanetriol, branched polyesters having trifunctional or polyfunctional hydroxyl groups, which are obtained from a dibasic acid starting from a polyester polyol and this compound as a glycol component as described in JP-B-6-64726. Of these, trifunctional compounds are preferable. In the case of tetrafunctional or polyfunctional compounds, they likely cause gelation during the reaction.

Examples of the polyisocyanate which can be used include isocyanates (for example, tolylene diisocyanate, 4,4'-di-phenylmethane diisocyanate (MDI), hexamethylene diisocyanate, xylylene diisocyanate, naphthylene-1,5-diisocyanate, o-toluidine diisocyanate, isophorone diisocyanate, and triphenylmethane triisocyanate), products between such an isocyanate and a polyalcohol, and polyisocyanates formed by condensation of an isocyanate.

The amount of the binder to be used in the magnetic layer and the amount for the binder to be used in the non-magnetic layer are usually in the range of from 5 to 50% by weight, and preferably from 10 to 30% by weight based on the ferromagnetic powder and the non-magnetic inorganic powder, respectively. It is preferable that in the case of using a vinyl chloride based resin, the vinyl chloride based resin is combined and used in an amount in the range of from 5 to 30% by weight; that in the case of using a polyurethane resin, the polyurethane resin is combined and used in an amount in the range of from 2 to 20% by weight; and that in the range of using a polyisocyanate, the polyisocyanate is combined and used in an amount in the range of from 2 to 20% by weight. For example, in the case where head corrosion occurs due to slight dechlorination, it is possible to use only a polyurethane and an isocyanate.

In such a magnetic tape, as a matter of course, it is possible to change the amount of the binder, the amount of the vinyl chloride based resin, polyurethane resin, polyisocyanate or other resins occupying in the binder, the molecular weight of the respective resin forming the magnetic layer, the amount of the polar group, or the foregoing physical properties of the resin depending upon the non-magnetic layer and the respective magnetic layer as the need arises. Rather, optimization should be made in each layer. Known technologies regarding multilayered magnetic layers are applicable. For example, in the case of changing the amount of the binder in each layer, for the purpose of reducing scuffs on the surface of the magnetic layer, it is effective to increase the amount of the binder in the magnetic layer. For the purpose of improving head touch against a head, by increasing the amount of the binder in the non-magnetic layer, it is possible to bring flexibility.

Ferromagnetic Powder

As the ferromagnetic powder to be used in the magnetic layer, ferromagnetic alloy powders containing α-Fe as the major component are preferable. Such a ferromagnetic powder may contain atoms (for example, Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B) in addition to prescribed atoms. In particular, it is preferred to contain at least one of Al, Si, Ca, Y, Ba, La, Nd, Co, Ni, and B in addition to α-Fe; and it is more preferred to contain at least one Co, Y, and Al in addition to α-Fe.

The ferromagnetic alloy fine powder may contain a small amount of a hydroxide or an oxide. As the ferromagnetic alloy fine powder, ones obtained by known production methods can be used. For example, the following methods can be enumerated. That is, there are a method of reducing a composite organic acid salt (mainly an oxalic acid salt) with a reducing gas such as hydrogen; a method of reducing iron oxide with a reducing gas such as hydrogen to obtain Fe or Fe—Co particles, etc.; a method of heat decomposing a metallic carbonyl compound; a method of adding a reducing agent (for example, sodium borohydride, hydrophosphites, and hydrazides) in an aqueous solution of a ferromagnetic metal; and a method of vaporizing a metal in a low-pressure inert gas to obtain a fine powder. The thus obtained ferromagnetic alloy powder may be subjected to a known gradual oxidation treatment such as a method of dipping in an organic solvent and then drying, a method of dipping in an organic solvent and then feeding an oxygen-containing gas to form an oxidized film on the surface, and a method of adjusting partial pressures of an oxygen gas and an inert gas without using an organic solvent to form an oxidized film on the surface.

As the ferromagnetic powder to be used in the magnetic layer, hexagonal ferrite fine powders can be also used. Examples of the hexagonal ferrite include barium ferrite, strontium ferrite, lead ferrite, calcium ferrite, and substitution products thereof, for example, Co substitution products. Specific examples thereof include magnetoplumbite type barium ferrite and strontium ferrite, magnetoplumbite type ferrite the particle surface of which is covered by spinel, and magnetoplumbite type barium ferrite and strontium ferrite partially containing a spinel phase. In addition to the prescribed atoms, atoms such as Al, Si, S, Sc, Ti, V, Cr, Cu, Y, Mo, Rh, Pb, Ag, Sn, Sb, Te, Ba, Ta, W. Re, Au, Hg, Pb, Bi, La, Ce, Pr, Nd, P. Co, Mn, Zn, Ni, Sr, B, Ge, and Nb may be contained. In general, ones in which elements such as Co—Ti, Co—Ti—Zr, Co—Ti—Zn, Ni—Ti—Zn, Nb—Zn—Co, Sb—Zn—Co, and Nb—Zn are added can be used.

(Non-Magnetic Layer)

The inorganic powder to be used in the non-magnetic layer is a non-magnetic powder and can be, for example, selected among inorganic compounds such as metal oxides, metal carbonates, metal sulfates, metal nitrides, metal carbides, and metal sulfides. By mixing carbon black in the non-magnetic layer, not only known effects such as reduction of the surface electrical resistance Rs and lowering of the light transmittance can be realized, but also a desired micro Vickers hardness can be obtained. Also, by containing carbon black in the lower layer, it is possible to bring a lubricant storage effect. With respect to the kind of carbon black, furnace black for rubber, thermal black for rubber, black for color, and acetylene black can be used. The carbon black of the lower layer should optimize the following characteristics depending upon the desired effect, and a combined use thereof may possibly give rise to more effects. Also, an organic powder can be added in the non-magnetic layer depending upon the purpose. Known technologies regarding a lubricant, a dispersant, additives, a solvent, and dispersion method of the non-magnetic layer and others for the non-magnetic layer can be applied.

Additives

As additives to be used in the magnetic layer or non-magnetic layer, etc., ones having a head polishing effect, a lubricating effect, an antistatic effect, a dispersing effect, a plasticizing effect, etc. are used. Specifically, ones described in WO 98/35345 are enumerated.

Examples of the lubricants include monobasic fatty acids having from 10 to 24 carbon atoms and their salts of a metal (for example, Li, Na, K, and Cu), mono-fatty acid esters, di-fatty acid esters or tri-fatty acid esters of a monobasic fatty acid having from 10 to 24 carbon atoms and a monohydric, dihydric, trihydric, tetrahydric, pentahydric or hexahydric alcohol having from 2 to 12 carbon atoms, fatty acid esters of a monoalkyl ether of an alkylene oxide polymer, and fatty acid amides having from 8 to 22 carbon atoms. The fatty acids and alcohols may contain an unsaturated bond or may be branched.

Specific examples of the fatty acids include capric acid, caprylic acid, lauric acid, myristic acid, palmitic acid, stearic acid, behenic acid, oleic acid, elaidic acid, linolic acid, linoleic acid, and isostearic acid. Specific examples of the esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleate.

(Back Layer)

It is preferable that the back layer contains carbon black and an inorganic powder. With respect to the binder and various additives, preparations of the magnetic layer and non-magnetic layer are applied. The thickness of the back layer is preferably from 0.1 to 1.0 μm, and more preferably from 0.4 to 0.6 μm.

(Support)

The support to be used in the magnetic tape is preferably a non-magnetic flexible support. As the support, known films such as polyesters (for example, polyethylene terephthalate and polyethylene naphthalate), polyolefins, cellulose triacetate, polycarbonates, aromatic or aliphatic polyamides, polyimides, polyamide-imides, polysulfone, polyaramid, and polybenzoxazole can be used. Above all, it is preferred to use a polyethylene terephthalate film or a polyimide film.

These supports may be previously subjected to a corona discharge treatment, a plasma treatment, an easy adhesion treatment, a heat treatment, and a dust removal treatment.

It is suitable that the support has an elastic modulus in the machine direction of from 3.5 to 20 GPa and an elastic modulus in the transverse direction of from 3.5 to 20 GPa, and preferably an elastic modulus in each of the machine direction and the transverse direction of from 4 to 15 GPa.

(Production Method)

The magnetic layer and the non-magnetic layer can be prepared by dissolving and dispersing the foregoing components in a solvent to prepare the respective coating liquids, which are then successively coated on the support (web). Any of a wet-on-wet system in which the magnetic layer is coated on the non-magnetic layer in the state that it is still wet, or a wet-on-dry system in which the magnetic layer is coated on the dried non-magnetic layer is employable. The coated and dried web is properly subjected to an orientation treatment, a calendaring treatment, and slitting.

Magnetic Tape for Data Recording

As the magnetic tape for data recording, one in which a magnetic layer is provided on a non-magnetic support, and a backcoat layer is provided, if desired is used. In a preferred embodiment, a non-magnetic lower layer and a magnetic upper layer are coated on a support having a thickness of 2 to 9 μm, and a backcoat layer is provided on the opposite face thereto. The constructive elements of the magnetic tape are those suitable for high-density recording, and magnetic tapes described in JP-A-2001-250219 and JP-A-2002-251710 are enumerated as preferred examples.

In the invention, by using a magnetic tape further having a thickness of from 3 to 11 μm, and preferably from 4 to 9 μm and a cupping of from 0.3 to 2 mm, and preferably from 0.3 to 1.5 mm per a width of ½ inch, a good winding figure is obtained, and a magnetic tape cartridge suited for high density is obtained.

Magnetic Tape Cartridge

The magnetic tape cartridge of the invention rotatably houses a single reel or plural reels having a magnetic tape wound on a cartridge case and is characterized in that the leader tape of the invention is used as a leader tape which is joined with the tip of the magnetic tape and which leads the magnetic tape, thereby unloading it into a magnetic recording and reproducing unit.

Magnetic Recording and Reproducing Unit

The leader tape of the invention gives rise to remarkable effects especially when it is used in a magnetic recording and reproducing unit having a track recording density of 100 kfci or more and a difference between a recording tack width and a reproducing track width of not more than 16 μm. More remarkable effects are given in a magnetic recording and reproducing unit having a difference between a recording tack width and a reproducing track width of not more than 10 μm.

It is suitable that the thickness of the leader tape is not more than 5 times, preferably not more than 3 times, and more preferably not more than 2 times the thickness of the magnetic tape.

It is desired that the length of the leader tape is at least a length obtaining by adding a length of the running passage from an opening of a cartridge to a drive reel in a magnetic recording and reproducing unit to a length corresponding to at least three rolls of the drive reel.

Figure 2:
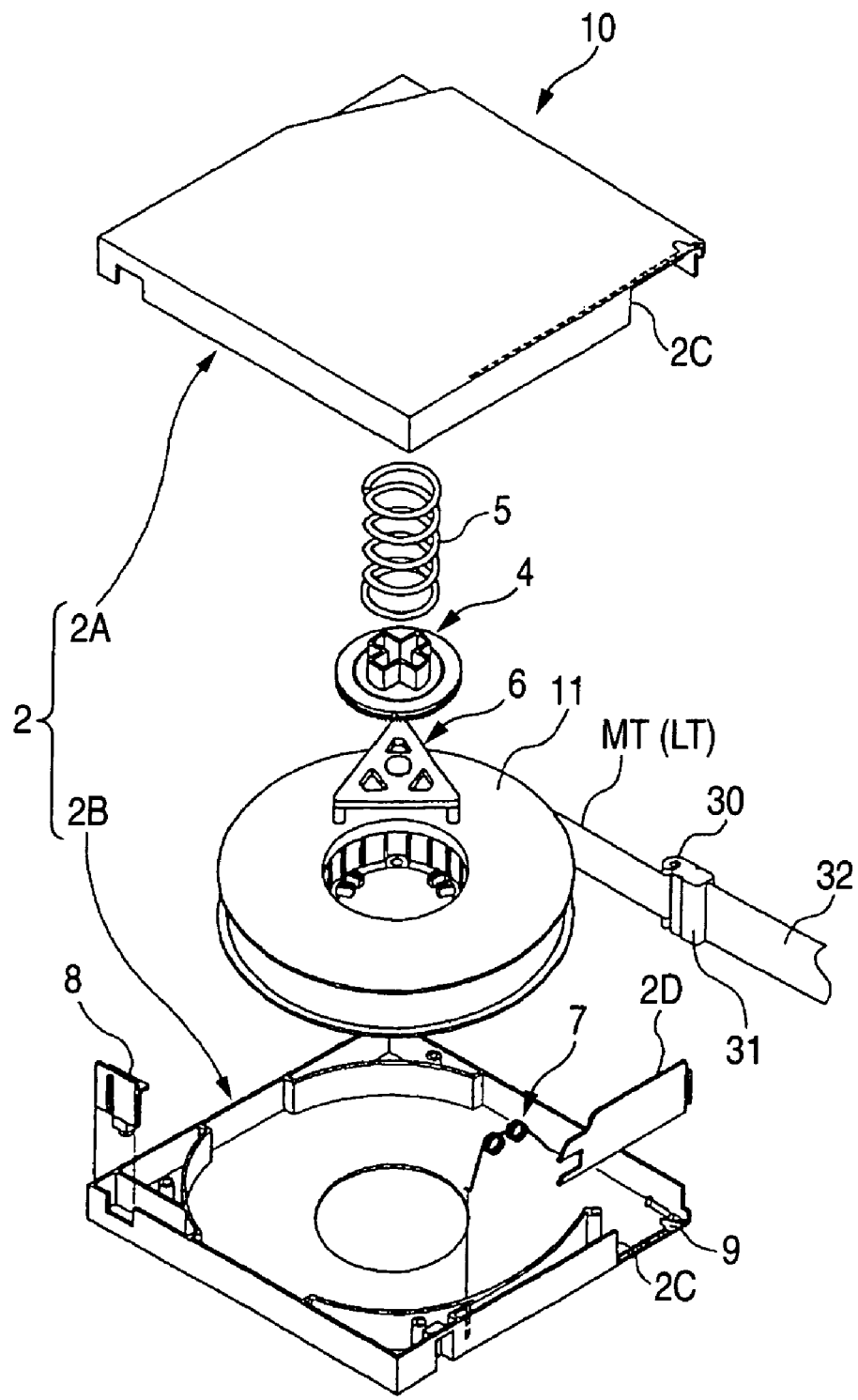
FIG. 2 is an exploded oblique view showing a magnetic tape cartridge to be used in this magnetic recording and reproducing unit according to the invention.
Figure 3A:
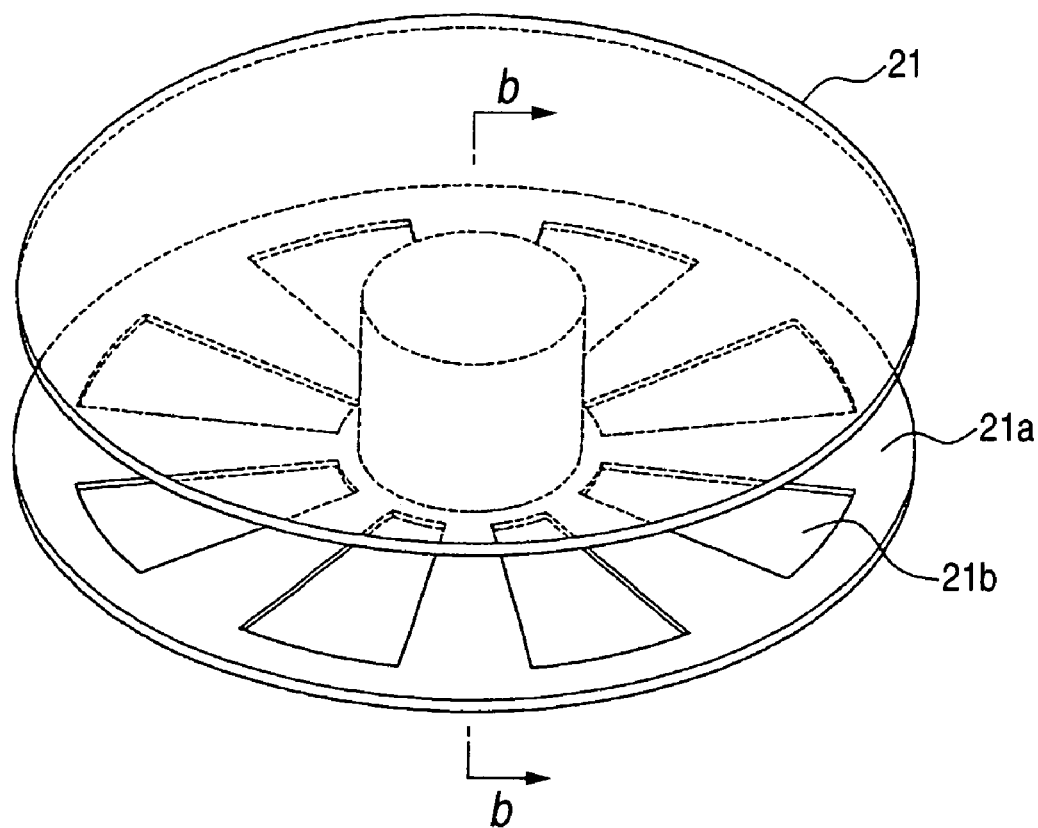
FIG. 3A is an oblique view showing a drive reel to be used in this magnetic recording and reproducing unit according to the invention.
Figure 3B:
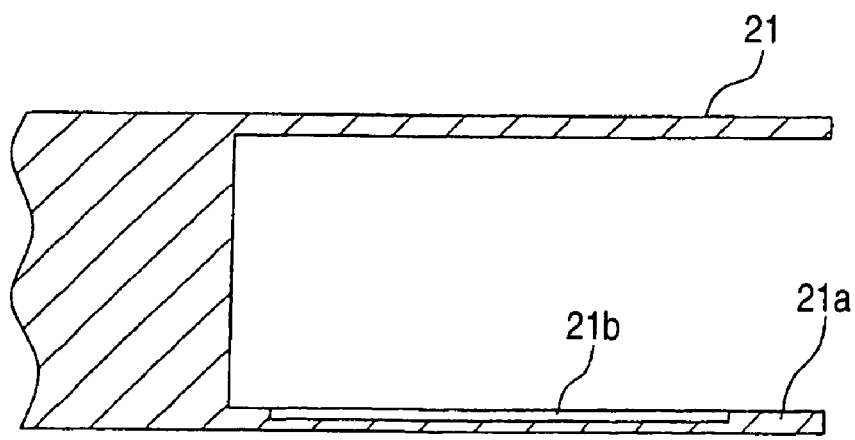
FIG. 3B is an enlarged cross-sectional view of a b-b line portion of FIG. 3A.
Figure 4A:
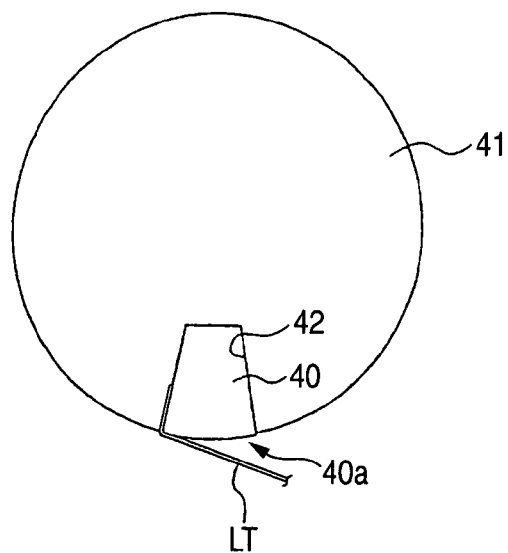
FIGS. 4A to 4C are a drawing to describe the conventional technologies.
Figure 4B:
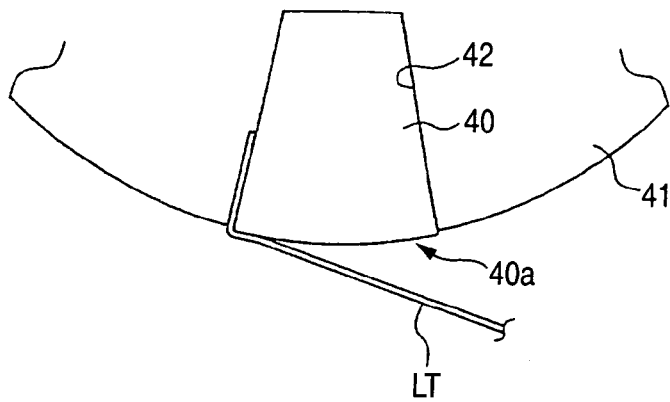
Figure 4C:
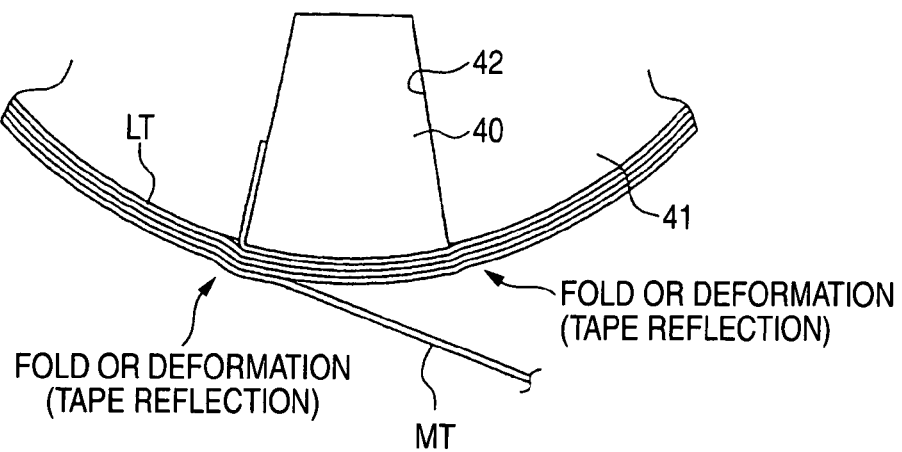

The details of the magnetic recording and reproducing unit according to an embodiment of the invention will be described below with reference to the drawings. In the drawings to be made hereof by reference, FIG. 1 is a constructive view conceptually showing a tape drive system according to one embodiment of the invention; FIG. 2 is an exploded oblique view showing a magnetic tape cartridge to be used in the magnetic recording and reproducing unit according to this embodiment; FIG. 3A is an oblique view showing a drive reel (winding reel) to be used in the magnetic recording and reproducing unit according to this embodiment; and FIG. 3B is an enlarged cross-sectional view of a b-b line portion of FIG. 3A. In this embodiment, a magnetic recording and reproducing unit constructed of a magnetic tape cartridge in which a recording medium in the tape state is wound in one cartridge reel (delivery reel) and a magnetic tape drive (tape drive) for charging this magnetic tape cartridge is described.

As illustrated in FIG. 1, a magnetic recording and reproducing unit 1 is constructed of a magnetic tape cartridge 10 and a magnetic tape drive 20. This magnetic recording and reproducing unit 1 executes recording of information into a magnetic tape MT as a magnetic tape as wound in the magnetic tape cartridge 10 or reproduction of information recorded in the magnetic tape MT while winding up the magnetic tape MT in a drive reel 21 of the magnetic tape drive 20 which becomes the receiving side, or rewinding the magnetic tape MT wound up in the drive reel 21 toward a cartridge reel (delivery reel) 11.

As illustrated in FIG. 2, the magnetic tape cartridge 10 conforms to the LTO standards and has a cartridge case 2 dividedly constructed of a lower half 2B and an upper half 2A. The inside of the cartridge case 2 is constructed of a single cartridge reel 11 in which the magnetic tape MT has been previously wound; a reel lock 4 and a compression coil spring 5 for keeping the rotation of the cartridge reel 11 in the locked state; a release pad 6 for releasing the locked state of the cartridge roll 11; a slide door 2D for opening and closing a magnetic tape-unloading outlet 2C formed on one side face of the cartridge case 2 extending the lower half 2B and the upper half 2A; a torsion coil spring 7 for energizing the slide door 2D at the closed position of the magnetic tape-unloading outlet 2C; an erroneous erase-preventing claw 8; a leader pin-housing portion 9 formed in the vicinity of the magnetic tape-uploading outlet 2C; and the like. A leader tape LT is joined with the tip of the magnetic tape MT. The magnetic tape MT illustrated in FIG. 2 expresses the leader tape LT.

As illustrated in FIG. 1, the magnetic tape cartridge 10 is charged in the magnetic tape drive 20, the leader tape LT is unloaded by a leader block 31 as described later, and the leader block 31 is fitted into a concave 23 provided in a core portion 22 of the drive reel 21 of the magnetic tape drive 20. In this way, it becomes possible to wind up the leader tape LT of the magnetic tape cartridge 10 in the core portion 22 of the drive reel 21.

The leader tape LT and the magnetic tape MT to be used in the magnetic tape cartridge 10 of this embodiment will be described below in detail.

The leader tape LT is formed in the longitudinal form. In this embodiment, the leader tape LT has a length such that it can be wound in a length corresponding to at least three rolls against the core portion 22 of the drive reel 21 of the magnetic tape drive 20. As the leader tape LT, one having a length of from 0.5 to 5.0 m is preferably used, and one having a length of from 0.5 to 3.0 m is more preferably used.

Next, the magnetic tape drive 20 will be described below.

As illustrated in FIG. 1, the magnetic tape drive 20 is provided with a spindle 24, a spindle drive unit 25 for driving this spindle 24, a magnetic head H, a drive reel 21, a winding reel drive unit 26 for driving the drive reel 21, and a control unit 27.

Also, the magnetic tape drive 20 has a leader block 31 capable of being engaged with a leader pin 30 (see FIG. 2) provided in the tip of the leader tape LT of the magnetic tape cartridge 10, and this leader block 31 is delivered into the side of the magnetic tape cartridge 10 by a non-illustrated unloading mechanism including an unloading guide 32, etc.

In executing data recording and reproduction in the magnetic tape MT, the spindle drive unit 25 and the winding reel drive unit 26 rotate and drive the spindle 24 and the drive reel 21, thereby delivering the magnetic tape MT.

As illustrated in FIGS. 3A and 3B, in the dry reel 21, grooves 21b are radially formed at equal intervals on the upper face of a lower flange portion 21a. The grooves 21b function as a discharge passage for discharging air entrained when the magnetic tape MT is wound up in the drive reel 21.

The action of the magnetic tape drive 20 will be described below.

When the magnetic tape cartridge 10 is installed in the magnetic tape drive 20 as illustrated in FIG. 1, the unloading guide 32 (see FIG. 2) unloads the leader pin 30 and delivers it to the drive reel 21 via the magnetic head H, and the leader block 31 is fitted in the concave 23 of the core portion 22 of the drive reel 21. The concave 23 is provided with a non-illustrated stopper which is engaged with the leader block 31 and prevents jumping up of the leader block 31 from the concave 23.

The spindle drive unit 25 and the winding reel drive unit 26 are driven by the control of the control unit 27, and the spindle 24 and the drive reel 21 are rotated in the same direction such that the leader tape LT and the magnetic tape MT are delivered from the cartridge reel 11 toward the drive reel 21. In this way, the leader tape LT is wound up in the drive reel 21, and thereafter, recording of information into the magnetic tape MT or reproduction of information recorded in the magnetic tape MT is executed by the magnetic head H while winding up the magnetic tape MT in the drive reel 21.

Also, in the case of rewinding the magnetic tape MT in the cartridge reel 11, by rotating and driving the spindle 24 and the drive reel 21 in the reverse direction to the foregoing direction, the magnetic tape MT is delivered into the cartridge reel 11. In rewinding, recording of information into the magnetic tape MT or reproduction of information recorded in the magnetic tape MT is executed, too.

In the light of the above, in the magnetic recording and reproducing unit 1, in many situations, the magnetic tape MT is usually in the state that it is wound up in the side of the magnetic tape cartridge 10. However, depending upon a use embodiment, the magnetic tape MT may be kept in the sate that it is wound up in the drive reel 21 in the side of the magnetic tape drive 20 over a long period of time. In such a use embodiment, effectiveness for preventing tape reflection from occurring is especially high, and therefore, the magnetic recording and reproducing unit 1 of this embodiment is suitable. That is, in winding up the magnetic tape MT in the drive reel 21 of the magnetic tape drive 20 from the magnetic tape cartridge 10, the leader block 31 for unloading the magnetic tape MT from the magnetic tape cartridge 10 is fitted into the core portion 22 of the drive reel 21. In this case, depending upon the dimensional precision of the leader block 31, there is some possibility that the leader block 31 is in the state that it is projected from the end face of the core portion 22 (a difference in level is generated). In such a case, when a conventional leader tape is wound up in the drive reel 21, the difference in level reflects into the magnetic tape MT, possibly resulting in impossibility of recording or a loss of information of the magnetic tape MT.

On the other hand, according to the magnetic recording and reproducing method of the invention, the difference in level can be well absorbed by the leader tape LT, and an excellent advantage that even by using the magnetic recording and reproducing unit 1 having a track recording density of 100 kfci or more and a difference between a recording tack width and a reproducing track width of from 0 to 16 μm, it is possible to prevent impossibility of recording or a loss of information of the magnetic tape MT from occurring.

EXAMPLES

The invention will be described below in detail with reference to the following Examples, but it should not be construed that the invention is limited thereto.

Example 1

The term "part" in the Examples means a part by weight.

Preparation of Leader Tape

| <Preparation of coating liquid> | |
|---|---|
| Coating liquid for upper layer: | |
| Ferromagnetic metal powder: | 100 parts |
| Coercive force Hc: | 191 kA/m (2400 Oe) |
| Specific surface area by BET method: | 62 m$^2$/g |
| Crystallite size: | 110 angstrom |
| Saturation magnetization amount σs: | 117 A · m$^2$/kg |
| Average long axis length: | 45 nm |
| Average acicular ratio: | 5 |
| pH: | 9.3 |
| Co/Fe: | 25 atomic % |
| Al/Fe: | 7 atomic % |
| Y/Fe: | 12 atomic % |
| Vinyl chloride based copolymer (MR-100 manufactured by ZEON CORPORATION): (—SO$_3$Na content: 5 × 10$^{-6}$ eq/g, degree of polymerization: 350, epoxy group content: 3.5% by weight as a monomer unit) | 5 parts |
| Polyester polyurethane resin: (neopentyl glycol/caprolactone polyol/MDI = 0.9/2.6/1 (weight ratio), —SO$_3$Na group content: 1 × 10$^{-4}$ eq/g) | 12 parts |
| α-Alumina (mean particle size: 0.3 μm): | 10 parts |
| Carbon black (mean particle size: 0.10 μm): | 1 part |
| Butyl stearate: | 1.5 parts |
| Stearic acid: | 0.5 parts |
| Methyl ethyl ketone: | 150 parts |
| Cyclohexanone: | 50 parts |
| Toluene: | 40 parts |

| -continued | |
|---|---|
| <Preparation of coating liquid> | |
| Coating liquid for lower layer: | |
| Non-magnetic powder, acicular α-iron oxide: | 80 parts |
| Specific surface area by BET method: | 58 m$^2$/g |
| Average long axis length: | 0.15 μm |
| Acicular ratio: | 7.5 |
| Carbon black: | 20 parts |
| Average primary particle size: | 16 nm |
| DBP oil absorption: | 80 mL/100 g |
| pH: | 8.0 |
| Specific surface area by BET method: | 250 m$^2$/g |
| Vinyl chloride based copolymer (MR-100 manufactured by ZEON CORPORATION): | 5 parts |
| Polyester polyurethane resin: (neopentyl glycol/caprolactone polyol/MDI = 0.9/2.6/1 (weight ratio), —SO$_3$Na group content: 1 × 10$^{-4}$ eq/g) | 5 parts |
| Butyl stearate: | 1.06 parts |
| Stearic acid: | 1.18 parts |
| Methyl ethyl ketone: | 150 parts |
| Cyclohexanone: | 50 parts |
| Toluene: | 40 parts |

With respect to each of the coating liquid for upper layer and the coating liquid for lower layer, the respective components were kneaded in a continuous kneader and dispersed using a sand mill. To each of the resulting dispersions, 5 parts of a polyisocyanate (CORONATE L manufactured by Nippon Polyurethane Industry Co., Ltd.) was added, to which was further added 40 parts of methyl ethyl ketone. The mixture was filtered by a filter having a mean pore size of 1 μm, thereby preparing a coating liquid for upper layer and a coating liquid for lower layer.

| Back layer forming coating liquid: | |
|---|---|
| Finely particulate carbon black: (BP-800 manufactured by Cabot Corporation, mean particle size: 17 nm) | 100 parts |
| Coarsely particulate carbon black: (Thermal black manufactured by Kern Culp, mean particle size: 270 nm) | 10 parts |
| α-Alumina (rigid inorganic powder): (mean particle size: 200 nm, Mohs hardness: 9) | 5 parts |
| Nitrocellulose resin: | 140 parts |
| Polyurethane resin: | 15 parts |
| Polyester resin: | 5 parts |
| Dispersant: copper oleate | 5 parts |
| Copper phthalocyanine: | 5 parts |
| Barium sulfate (precipitated): (BF-1 manufactured by Sakai Chemical Industry Co., Ltd., mean particle size: 50 nm, Mohs hardness: 3) | 5 parts |
| Methyl ethyl ketone: | 1,200 parts |
| Butyl acetate: | 300 parts |
| Toluene: | 600 parts |

The components for forming the back layer were kneaded in a continuous kneader and dispersed using a sand mill. To the resulting dispersion, 40 parts of a polyisocyanate (CORONATE L manufactured by Nippon Polyurethane Industry Co., Ltd.) and 1,000 parts of methyl ethyl ketone were added. The mixture was filtered by a filter having a mean pore size of 1 μm, thereby preparing a coating liquid for back layer.

Preparation of Leader Tape

The thus obtained coating liquid for upper layer and coating liquid for lower layer were subjected to simultaneous double-jet coating on a longitudinal polyethylene terephthalate (PET) support (thickness: 14.5 μm, Young's modulus in the machine direction (MD): 500 kg/mm² (4.9 GPa), Young's modulus in the transverse direction (TD): 500 kg/mm² (4.9 GPa), center line average surface roughness Ra on the upper layer-coated face: 35 nm, Ra in the back face side: 36 nm) such that the thickness of the upper layer and the lower layer after drying became 0.1 μm and 1.4 μm, respectively. Subsequently, the laminate was subjected to an orientation treatment in the state that the upper layer was still wet using a cobalt magnet having a magnetic force of 300 mT and a solenoid having a magnetic force of 150 mT, followed by drying to form an upper layer.

Thereafter, in the other side (opposite side to the upper layer) of the support, the coating liquid for back layer was coated such that the thickness after drying became 0.5 μm, followed by drying to form a back layer. There was thus obtained a roll for leader tape provided with an upper layer on one face of the support and a back layer on the other face.

Further, the roll after the heat treatment was subjected to a calender treatment by passing through a 7-stage calender processor constructed of a heat metal roll and an elastic roll in which a core is covered by a thermosetting resin (temperature: 90° C., linear pressure: 300 kg/cm (294 kN/m)).

The resulting roll was heat treated at 50° C. for 48 hours. Thereafter, the roll was cut into a width of ½ inch, thereby preparing a leader tape. The leader tape had a total thickness of 16.5 μm, an Ra of the magnetic upper layer face of 25 nm, an Ra of the back layer face of 30 nm, and a cupping of 0.2 mm.

Magnetic Tape for Data Recording

The coating liquids for upper and lower layers as used in the leader tape and the coating liquid for back layer were subjected to simultaneous double-jet coating on a polyethylene naphthalate (PEN) support having an Ra in the magnetic face side of 3 nm and a thickness of 5.2 μm such that the thickness of the non-magnetic lower layer and the magnetic layer after drying became 1.0 μm and 0.1 μm, respectively, followed by subjecting to a magnetic field orientation treatment in the same manner as in the leader tape.

Next, a back layer was formed such that the thickness after drying became 0.5 μm. A magnetic tape for data recording having a width of ½ inch was obtained in the same manner as in the leader tape. The cupping was 0.6 mm.

In both the leader tape and the magnetic tape for data recording, the cupping was controlled by a balance in the thickness between the back layer and the non-magnetic lower layer. That is, in the case of increasing the cupping, the thickness of the back layer was made thick, whereas the thickness of the non-magnetic lower layer was made thin.

Preparation of Magnetic Tape Cartridge

The obtained magnetic tape having a width of ½ inch was used as a leader tape and connected to the magnetic tape for data recording, thereby preparing a magnetic tape cartridge. 830 m of the magnetic tape was wound up.

Evaluation of Magnetic Tape Cartridge

The obtained magnetic tape cartridge was evaluated according to the following measurement conditions. The results obtained are shown in the following Table 1.

(1) The magnetic tape cartridge was recorded with signals of a recording track width of 10 μm, a reproducing track width of 4.5 μm and a track recording density of 150 kfci using an LTO-modified drive, and the full length of the magnetic tape was wound up in a dry reel under a tension of 0.8 N and preserved at 50° C. for 12 hours for every drive. After the preservation, when the tape was reproduced, an error rate of the start end portion of the tape was measured. The expression "7.0E−0.7" in the error rate means "$7.0 \times 10^{-7}$" (others are also the same)

(2) Evaluation of Winding Figure:

The magnetic tape cartridge was subjected to 100-pass at a delivery rate of 6 m/s using the foregoing LTO-modified drive and then measured for the number of occurrence of jumping up on the winding face.

Example 2

The same procedures as in Example 1 were followed, except that in the preparation of the leader tape of Example 1, the thickness of the support was 5.5 μm, the Ra was made large by setting up Ra in the magnetic upper layer side at 60 nm and Ra in the back layer side at 65 nm, respectively, and the cupping was made large by setting up the thickness of the non-magnetic lower layer at 0.8 μm and the thickness of the back layer at 0.7 μm, respectively.

Example 3

The same procedures as in Example 1 were followed, except that in the preparation of the leader tape of Example 1, the Ra in the magnetic upper layer side of the support was set up at 15 nm, the Ra in the back layer side was set up at 20 nm, and the thickness of the non-magnetic lower layer was set up at 3 μm, thereby making the cupping small.

Example 4

The same procedures as in Example 1 were followed, except that using the leader tape of Example 1, the thickness of the tape for data recording was set up at 9 μm (thickness of support: 7 μm, thickness of non-magnetic lower layer: 1.4 μm, thickness of magnetic layer: 0.1 μm, thickness of back layer: 0.5 μm).

Example 5

The same procedures as in Example 2 were followed, except that using the leader tape of Example 2, the thickness of the tape for data recording was set up at 4.5 μm (thickness of support: 3.6 μm, thickness of non-magnetic lower layer: 0.3 μm, thickness of magnetic layer: 0.1 μm, thickness of back layer: 0.5 μm).

Comparative Example 1

The same procedures as in Example 1 were followed, except that in the preparation of the leader tape of Example 1, the Ra was made small by setting up Ra in the magnetic upper layer side at 6 nm and Ra in the back layer side at 8 nm, respectively, and the cupping was made large by setting up the thickness of the non-magnetic lower layer at 1 μm and the thickness of the back layer at 0.9 μm, respectively.

Comparative Example 2

The same procedures as in Example 1 were followed, except that in the preparation of the leader tape of Example 1, the support was adjusted so as to have an Ra in the magnetic upper layer side of 75 nm, an Ra in the back layer side of 65 nm and a thickness of 21.0 μm and that the data tape was adjusted so as to have a thickness of the non-magnetic lower layer of 1.2 μm and a thickness of the back layer of 0.3 μm.

Comparative Example 3

The same procedures as in Example 2 were followed, except that in the preparation of the leader tape of Example 2, the cupping was made large by setting the thickness of the support at 3 μm and the thin tape of the Example 5 was used as the magnetic tape.

TABLE 1

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Leader tape | Ra of upper layer (nm) | 25 | 55 | 12 | 25 | 55 | 5 | 68 | 55 |
|  | Ra of back layer (nm) | 30 | 59 | 18 | 30 | 59 | 6.7 | 62 | 59 |
|  | Cupping (mm) | 0.2 | 0.8 | 0.1 | 0.2 | 0.8 | 0.2 | 0.2 | 1.2 |
|  | Thickness (μm) | 16.5 | 7.1 | 18.1 | 16.5 | 7.1 | 16.5 | 23 | 4.6 |
| Data tape | Cupping (mm) | 0.6 | 0.6 | 0.6 | 0.4 | 1.8 | 0.6 | 0.1 | 1.8 |
|  | Thickness (μm) | 6.8 | 6.8 | 6.8 | 9 | 4.5 | 6.8 | 6.8 | 4.5 |
| Error rate of start end portion |  | 7.0E-07 | 3.0E-0.6 | 2.0E-0.6 | 5.0E-0.7 | 7.6E-0.6 | 3.3E-0.3 | Head broken | 2.5E-0.3 |
| Number of jumping (per roll) |  | 0 | 0 | 1 | 2 | 0 | 2 | 16 | 1 |

According to the invention, in high-density recording using a thin magnetic tape by making the surface roughness and cupping amount of the leader tape fall with the specified ranges, it is possible to achieve suppression of an error increase due to reflection of a leader block and realization of a good winding figure by defining the cupping of a data tape.

It is noted that the Examples of the invention are small in the error rate or excellent in the winding figure as compared with the Comparative Examples.

This application is based on Japanese Patent application JP 2004-91823, filed Mar. 26, 2004, the entire content of which is hereby incorporated by reference, the same as if set forth at length.

What is claimed is:

1. A leader tape comprising a support and a coating layer containing a powder and a binder, wherein at least one surface of the leader tape has a center line average roughness (Ra) of from 10 to 60 nm, and the leader tape has a cupping of from 0 to 1 mm per a width of ½ inch, and wherein the leader tape has a thickness of from 5 to 20 μm.

2. The leader tape according to claim 1, wherein at least one surface of the leader tape has a center line average roughness (Ra) of from 15 to 45 nm.

3. The leader tape according to claim 1, wherein the leader tape has a cupping of from 0 to 0.6 mm per a width of ½ inch.

4. The leader tape according to claim 1, which comprises:
a back layer containing carbon black;
the support;
a non-magnetic layer containing an inorganic powder and a binder; and
a magnetic layer containing a ferromagnetic powder and a binder,
in this order.

5. The leader tape according to claim 4, wherein the back layer has a thickness of from 0.1 to 1.0 μm.

6. The leader tape according to claim 4, wherein the back layer has a thickness of from 0.4 to 0.6 μm.

7. The leader tape according to claim 4, wherein the non-magnetic layer has a thickness of from 0.5 to 3.0 μm.

8. A magnetic tape cartridge comprising: a reel; a magnetic tape; a cartridge case; and the leader tape according to claim 1, wherein the magnetic tape cartridge rotatably houses the reel having the magnetic tape wound on the reel in the cartridge case, and the leader tape according to claim 1 is joined with a tip of the magnetic tape and leads the magnetic tape, thereby uploading it into a magnetic recording and reproducing unit.

9. The magnetic tape cartridge according to claim 8, wherein the magnetic tape has a thickness of from 3 to 11 μm and a cupping of from 0.3 to 2 mm per a width of ½ inch.

* * * * *